United States Patent
Garcia Garcia et al.

(10) Patent No.: US 12,433,345 B2
(45) Date of Patent: Oct. 7, 2025

(54) AEROSOL GENERATION DEVICE BATTERY MONITORING

(71) Applicant: JT International SA, Geneva (CH)

(72) Inventors: Eduardo Jose Garcia Garcia, Grand-Saconnex (CH); Layth Bouchuiguir, Bellevue (CH)

(73) Assignee: JT International SA (CH)

( * ) Notice: Subject to any disclaimer, the term of this patent is extended or adjusted under 35 U.S.C. 154(b) by 498 days.

(21) Appl. No.: 17/910,615

(22) PCT Filed: Mar. 10, 2021

(86) PCT No.: PCT/EP2021/056105
§ 371 (c)(1),
(2) Date: Sep. 9, 2022

(87) PCT Pub. No.: WO2021/180815
PCT Pub. Date: Sep. 16, 2021

(65) Prior Publication Data
US 2023/0148677 A1    May 18, 2023

(30) Foreign Application Priority Data
Mar. 10, 2020    (EP) .................................. 20162222

(51) Int. Cl.
*A24F 13/00*    (2006.01)
*A24F 40/53*    (2020.01)
*A24F 40/90*    (2020.01)

(52) U.S. Cl.
CPC .............. *A24F 40/53* (2020.01); *A24F 40/90* (2020.01)

(58) Field of Classification Search
CPC ....................................................... A24F 47/00
(Continued)

(56) References Cited

U.S. PATENT DOCUMENTS

2015/0181942 A1    7/2015  Holzherr et al.
2015/0272223 A1   10/2015  Weigensberg et al.
(Continued)

FOREIGN PATENT DOCUMENTS

CN    102132957 A    7/2011
CN    104584366 A    4/2015
(Continued)

OTHER PUBLICATIONS

Search Report dated Sep. 17, 2024 from the Office Action for Chinese Application No. 202180019834.5 issued Sep. 20, 2024, 3 pages.
(Continued)

*Primary Examiner* — Phuong K Dinh
(74) *Attorney, Agent, or Firm* — Lerner David LLP

(57) ABSTRACT

An aerosol generation device includes an indicator and a controller connectable to a battery and a heater. The heater is configurable to aerosolise a unit of aerosol generating material in an aerosolisation session and the battery is configurable to provide power to the heater for one or more aerosolisation sessions. The controller is configured to measure a charge level of the battery, determine whether the measured charge level is sufficient for only a predetermined number N of aerosolisation sessions by the heater, and to indicate, using the indicator in a first manner, when the measured charge level is sufficient for only N aerosolisation sessions by the heater.

17 Claims, 6 Drawing Sheets

(58) Field of Classification Search
USPC .................................................. 131/328–329
See application file for complete search history.

(56) References Cited

U.S. PATENT DOCUMENTS

2016/0316821 A1    11/2016  Liu
2020/0245688 A1     8/2020  Yamada et al.
2020/0390154 A1*   12/2020  Bouchuiguir ........... A24F 40/46

FOREIGN PATENT DOCUMENTS

| | | |
|---|---|---|
| CN | 106255428 A | 12/2016 |
| EP | 3285354 A1 | 2/2018 |
| JP | 2012527222 A | 11/2012 |
| WO | 2010133342 A1 | 11/2010 |
| WO | 2019082249 A1 | 5/2019 |
| WO | 2019156382 A1 | 8/2019 |
| WO | 2019162154 A1 | 8/2019 |
| WO | 2019170901 A1 | 9/2019 |

OTHER PUBLICATIONS

Search Report dated May 9, 2024 from the Office Action for Taiwanese Application No. 110108478, 2 pages.
International Search Report for PCT/EP2021/056105 mailed May 7, 2021. 4 pgs.

\* cited by examiner

100

| Controller 102 | Indicator(s) 104 |
| --- | --- |
| Heater 108 | Battery 106 |

FIG. 2

Measure a charge level of the battery — S301

↓

Determine whether the measured charge level is sufficient for only a predetermined number N of aerosolisation sessions by the heater — S302

↓

Indicate, using the indicator in a first manner, when the measured charge level is sufficient for only N aerosolisation sessions by the heater — S303

FIG. 3

```
┌─────────────────────────────────────┐
│  Measure a charge level of the battery │─── S301
└─────────────────────────────────────┘
                    │
                    ▼
┌─────────────────────────────────────┐
│  Determine whether the measured charge │─── S402
│  level is sufficient for at least one full │
│  aerosolisation session by the heater │
└─────────────────────────────────────┘
                    │
                    ▼
┌─────────────────────────────────────┐
│     Switch the heater on when the    │─── S403
│  charge level of the battery is sufficient │
│    for at least one full aerosolisation │
│         session by the heater        │
└─────────────────────────────────────┘
```

*FIG. 4*

```
┌─────────────────────────────────────┐
│  Measure a charge level of the battery │─── S301
└─────────────────────────────────────┘
                    │
                    ▼
┌─────────────────────────────────────┐
│  Determine whether the measured charge │─── S502
│  level of the battery is lower than that │
│   required for one full aerosolisation │
│         session by the heater        │
└─────────────────────────────────────┘
                    │
                    ▼
┌─────────────────────────────────────┐
│   Indicate, using the indicator in a second │─── S503
│   manner, that the measured charge level │
│      is insufficient for an aerosolisation │
│   session by the heater in response to │
│   determining that the charge level of the │
│    battery is lower than that required for │
│       one full aerosolisation session │
└─────────────────────────────────────┘
```

*FIG. 5*

```
┌─────────────────────────────────┐
│  Measure a charge level of the  │─── S301
│             battery             │
└─────────────────────────────────┘
                 │
                 ▼
┌─────────────────────────────────┐
│  Determine an available number  │─── S602
│    of aerosolisation sessions   │
│      that can be sufficiently   │
│   powered by the battery based  │
│    upon the measured charge     │
│              level              │
└─────────────────────────────────┘
                 │
                 ▼
┌─────────────────────────────────┐
│  Indicate, using the indicator  │─── S603
│       in a third manner, an     │
│      indication of the          │
│  available number of aerosolisation │
│   sessions that can be sufficiently │
│     powered by the battery      │
└─────────────────────────────────┘
```

*FIG. 6*

AEROSOL GENERATION DEVICE BATTERY MONITORING

CROSS-REFERENCE TO RELATED APPLICATIONS

The present application is a national phase entry under 35 U.S.C. § 371 of International Application No. PCT/EP2021/056105, filed Mar. 10, 2021, published in English, which claims priority to European Application No. 20162222.2 filed Mar. 10, 2020, the disclosures of which are incorporated herein by reference.

FIELD OF INVENTION

The present invention relates to aerosol generating devices, and more specifically battery monitoring for aerosol generation devices.

BACKGROUND

Aerosol generation devices such as electronic cigarettes and other aerosol inhalers or vaporisation devices are becoming increasingly popular consumer products.

Heating devices for vaporisation or aerosolisation are known in the art. Such devices typically include a heater arranged to heat a vaporisable or aerosolisable product. In operation, the vaporisable or aerosolisable product is heated with the heater to vaporise or aerosolise the constituents of the product for the consumer to inhale. In some examples, the product may comprise tobacco and may be similar to a traditional cigarette, in other examples the product may be a liquid, or liquid contents in a capsule.

There is a need for precise battery monitoring in such devices. An object of the invention is, therefore, to address such a challenge.

SUMMARY OF INVENTION

According to a first aspect, there is provided an aerosol generation device comprising an indicator and a controller connectable to a battery and a heater, the heater configurable to aerosolise a unit of aerosol generating material in an aerosolisation session and the battery configurable to provide power to the heater for one or more aerosolisation sessions, wherein the controller is configured to: measure a charge level of the battery; determine whether the measured charge level is sufficient for only a predetermined number N of aerosolisation sessions by the heater; and indicate, using the indicator in a first manner, when the measured charge level is sufficient for only N aerosolisation sessions by the heater.

In this way, a warning can be provided to a user of the aerosol generation device when there is only enough battery power remaining for N aerosolisation sessions. This allows the user to anticipate the need to charge the battery before the battery runs out, thereby negating the risk of running out of power when using the device.

Preferably, an aerosolisation session comprises a heating regime executed by the heater to aerosolise one aerosol generating material consumable. Preferably the aerosol generating material is tobacco. Preferably a unit of aerosol generating material comprises one tobacco rod (similar to a traditional cigarette). Alternatively the aerosol generating material may be a vapor forming liquid, and a unit of aerosol generating material may comprise a capsule of vapor forming liquid. Preferably, the aerosolisation comprises heating the aerosol generating material, without burning it, to generate an aerosol or vapor. Preferably, the indicator is at least one of a visual indicator, an audio indicator or a haptic indicator. The indicator may comprise one indicator operable in one or more manners, or a plurality of indicators operable in one or more manners. Preferably the predetermined number N of aerosolisation sessions is one (N=1), representative of the battery having only enough power remaining for one aerosolisation session. In another example N=2, representative of the battery having only enough power remaining for two aerosolisation sessions. In another example, N may be equal to the total number of units of aerosol generating material (or tobacco rods) in a packet, for example N=20. The skilled person will readily understand however that N can be any other suitable positive integer number.

Preferably, when determining whether the measured charge level is sufficient for only N aerosolisation sessions by the heater, the controller is further configured to: compare the measured charge level to a first predetermined charge level and a second predetermined charge level, wherein the first predetermined charge level corresponds to the battery having a charge level insufficient for N+1 aerosolisation sessions, and the second predetermined charge level corresponds to the battery having a charge level sufficient for N aerosolisation sessions; and determine that the measured charge level is sufficient for only N aerosolisation sessions when the measured charge level is less than the first predetermined charge level and greater than or equal to the second predetermined charge level.

In this way, the controller can determine when only enough power remains in the battery to fully aerosolize N aerosol generating material consumables.

Preferably, the controller is configured to: measure the charge level of the battery before each aerosolisation session; and/or measure the charge level of the battery after each aerosolisation session; and/or measure the charge level of the battery when the heater is switched off.

Measuring the charge level and determining and indicating when the measured charge level is sufficient for only the predetermined number N of aerosolisation sessions before each aerosolisation session is advantageous as a user can be made aware before the aerosolisation session that they only have the battery charge for N sessions remaining. This is particularly advantageous in the case of the predetermined number N being one, as the user will be informed before the aerosolisation session that this is the last aerosolisation session for which the battery has sufficient charge.

Measuring the charge level and determining and indicating when the measured charge level is sufficient for only the predetermined number N of aerosolisation sessions after each aerosolisation session is advantageous as following the conclusion of the aerosolisation session, if the battery level is only sufficient for N more sessions, the user will be alerted. This is particularly advantageous in the case of the predetermined number N being one, as the user will be informed that the next aerosolisation session is the last aerosolisation session for which the battery has sufficient charge.

Measuring the charge level after switching off the heater can provide a more accurate measurement of the charge level of the battery as a heating load is not being applied.

Preferably, the aerosol generation device further comprises a closable opening through which the aerosol generating material is received, and wherein the controller is configured to: measure the charge level of the battery when determining the closable opening is moved to a closed position; and/or measure the charge level of the battery when determining the closable opening is moved to an opened position.

In this way, the measurement of the charge level can be triggered by a user action at the end of the aerosolisation session (determining the closable opening has moved to the closed position), or at the start of an aerosolisation session (determining the closable opening has moved to the open position). Such a triggering allows for the indication in the first manner to be indicated at an appropriate time, either at the end or start of an aerosolisation session.

Preferably, when determining the closable opening is moved to the closed position, the controller is further configured to switch off the heater before determining the charge level of the battery.

Preferably, when determining the closable opening is moved to the opened position, the controller is further configured to: initiate a standby mode during which the charge level of the battery is measured; and switch the heater on, and exit the standby mode, in response to determining that the charge level of the battery is sufficient for at least one full aerosolisation session by the heater.

In this way, the measurement of the charge level can be specifically made before the heater switches on; this can improve the accuracy of the measurement.

Preferably, the controller is further configured to: determine whether the measured charge level is sufficient for at least one full aerosolisation session by the heater; and switch the heater on automatically in response to determining the charge level of the battery is sufficient for at least one full aerosolisation session by the heater; or switch the heater on in response to the detection of an activation instruction when the charge level of the battery is sufficient for at least one full aerosolisation session by the heater.

In this way, the heater is switched on only when there is sufficient power for a full aerosolisation session. This avoids the aerosol generating device only being able to partially aerosolise the unit of aerosol generating material due to the battery running out charge before completion of an aerosolisation session.

Preferably, the indicator comprises at least one light emitting source comprised in the aerosol generation device.

In this way, the indication can be visually conveyed to a user of the device.

Preferably, the controller is further configured to: determine whether the measured charge level of the battery is lower than that required for one full aerosolisation session by the heater; and indicate, using the indicator in a second manner, that the measured charge level is insufficient for an aerosolisation session by the heater in response to determining that the charge level of the battery is lower than that required for one full aerosolisation session.

In this way, the user is informed when there is insufficient power for a full aerosolisation session. This avoids the user finding, part way through an aerosolisation session, that they are only able to partially aerosolise the unit of aerosol generating material due to the battery running out charge before completion of an aerosolisation session. This avoids potential wastage of a unit of aerosol generating material due to only partial aerosolisation.

Preferably, the second manner of using the indicator is different from the first manner of using the indicator. Preferably, the first manner comprises illuminating a light source with a first flashing frequency or pattern and the second manner comprises illuminating a light source with a second different flashing frequency or pattern. Alternatively, the first manner comprises illuminating a light source in a first colour and the second manner comprises illuminating a light source in a second different colour. The light source used in the first manner can be the same light source or a different light source to that used in the second manner.

Preferably, the controller is further configured to: determine that the measured charge level is lower than that required for one full aerosolisation session by the heater in response to executing one aerosolisation session after determining that the measured charge level is sufficient for only one full aerosolisation session by the heater.

In this way, it can be automatically determined that the charge level is insufficient for an aerosolisation session by the heater.

Preferably, when measuring the charge level, the controller is configured to: measure a voltage of the battery; and compare the measured battery voltage to predetermined battery voltages with corresponding predetermined battery charge levels; and determine the measured battery charge level based upon the comparison between the measured battery voltage and the predetermined battery voltages and corresponding predetermined battery charge levels.

In this way, the charge level of the battery can be measured using a measurement of the battery voltage; this provides accuracy in the measured battery charge level.

Preferably, the predetermined battery voltages and corresponding predetermined battery charge levels are stored in memory accessible by the controller.

Preferably, the controller is further configured to: determine an available number of aerosolisation sessions that can be sufficiently powered by the battery based upon the measured charge level; and indicate, using the indicator in a third manner, an indication of the available number of aerosolisation sessions that can be sufficiently powered by the battery.

In this way, a user of the aerosol generation device can be informed of the remaining number of available aerosolisation sessions. This allows the user to plan their aerosolisation sessions before charging the battery, rather than unexpectedly finding that the charge level is too low for an aerosolisation session. This improves the user experience.

Preferably indicating the indication of the available number of aerosolisation sessions that can be sufficiently powered by the heater comprises illuminating a number of light emitting sources that correspond to the available number of aerosolisation sessions.

According to a second aspect, there is provided an aerosol generation device system comprising an aerosol generation device according to the first aspect, and further comprising the battery and the heater.

According to a third aspect, there is provided a method of operating an aerosol generation device comprising an indicator and a controller connectable to a battery and a heater, the heater configurable to aerosolise a unit of aerosol generating material in an aerosolisation session and the battery configurable to provide power to the heater for one or more aerosolisation sessions, wherein the method comprises: measuring, by the controller, a charge level of the battery; determining, by the controller, whether the measured charge level is sufficient for only a predetermined number N of aerosolisation sessions by the heater; and indicating, using the indicator in a first manner, when the measured charge level is sufficient for only N aerosolisation sessions by the heater.

Preferably, the third aspect comprises the preferable features of the first aspect.

According to a fourth aspect, there is provided non-transitory computer-readable medium storing instructions thereon that, when executed by one or more processors, cause the one or more processors to control an aerosol generation device, wherein the aerosol generation device comprises an indicator and a controller connectable to a battery and a heater, the heater configurable to aerosolise a unit of aerosol generating material in an aerosolisation session and the battery configurable to provide power to the heater for one or more aerosolisation sessions, and wherein the instructions cause the one or more processors to: measure, by the controller, a charge level of the battery; determine, by the controller, whether the measured charge level is sufficient for only a predetermined number N of aerosolisation sessions by the heater; and indicate, using the indicator in a first manner, when the measured charge level is sufficient for only N aerosolisation sessions by the heater.

Preferably, the fourth aspect comprises the preferable features of the first aspect.

BRIEF DESCRIPTION OF THE DRAWINGS

Embodiments of the invention are now described, by way of example, with reference to the drawings, in which:

FIG. 2 is a block diagram of components of an aerosol generation device;

FIG. 3 is a flow diagram of an operational method of an aerosol generation device;

FIG. 4 is another flow diagram of an operational method of an aerosol generation device;

FIG. 5 is another flow diagram of an operational method of an aerosol generation device;

FIG. 6 is another flow diagram of an operational method of an aerosol generation device.

DETAILED DESCRIPTION

Figure 1A:
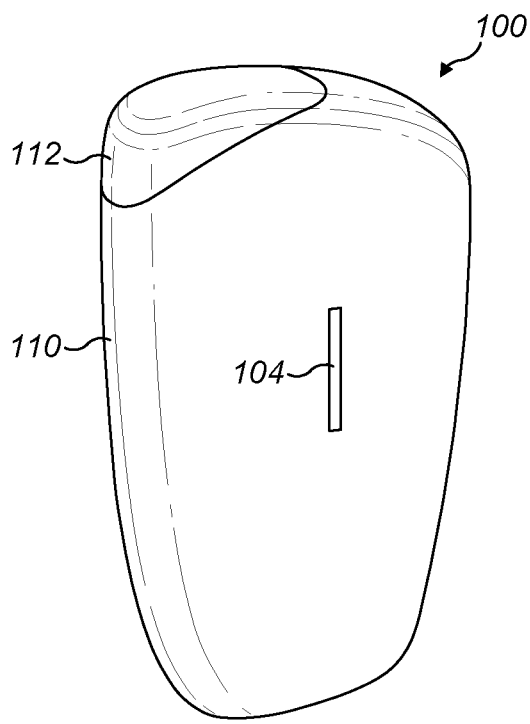
FIGS. 1A and 1B are schematic diagrams of an aerosol generation device with a closable opening respectively in a closed and open position.
Figure 1B:
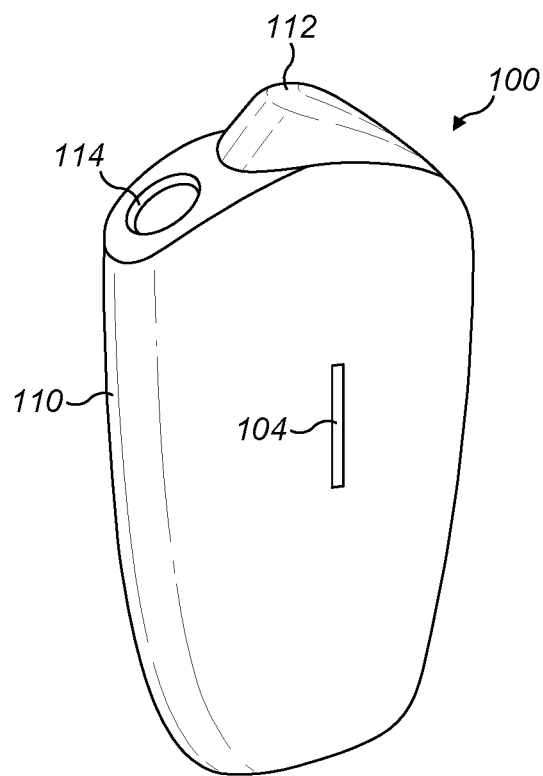

FIGS. 1A and 1B show a schematic illustration of an aerosol generation device 100, also known as a vapor generation device or electronic cigarette. The aerosol generation device 100 is arranged to receive a unit of an aerosol generating material. In the example of FIGS. 1A and 1B, the unit of an aerosol generating material can be a tobacco rod. Whilst the subsequent examples are directed to the unit of an aerosol generating material being a tobacco rod, the skilled person will, however, understand that the present disclosure can also be readily applied to aerosol generation devices arranged to receive aerosol generating material in the form of a vaporisable liquid, for example with a unit of the aerosol generating material being a capsule containing the vaporisable liquid. Within the context of the present disclosure, the terms vapour and aerosol can be used interchangeably.

The aerosol generation device 100 of FIGS. 1A and 1B includes a closable opening 114 to a cavity or heating chamber within an outer casing 110 of the aerosol generation device 100. The tobacco rod insertable through the closable opening 114 such that a first portion of the tobacco rod is positioned within the cavity and a second portion of the tobacco rod extends outwardly from the cavity. A heater 108 is located within the cavity so as to engage the first portion of the tobacco rod. The heater 108 is arranged to heat the tobacco rod, without burning it, so as to generate an aerosol. The second portion of the tobacco rod forms a mouthpiece through which a user of the device can inhale the generated aerosol.

The opening and closing of the closable opening 114 is provided by a moveable lid 112. In the example of the FIGS. 1A and 1B, the moveable lid 112 is slidable between a closed position (FIG. 1A) and an open position (FIG. 1B). In other examples the moveable lid 112 may be any other type of moveable lid 112, such as a hinged lid.

A controller 102 of the aerosol generation device 100 (described in more detail subsequently) can determine that the closable opening 114 has moved from the closed position (FIG. 1A) to the open position (FIG. 1B) when the slidable lid 112 is moved between the two positions. The controller 102 can likewise determine that the closable opening 114 has moved from the open position to the closed position. One or more sensors can be arranged in the casing 110 of the aerosol generation device 100. When the slidable lid 112 moves to the open position the controller 102 can use the sensor(s) to detect the position change and hence the movement of the lid 112.

One or more indicator(s) 104, such as light emitting indicators (for example, one or more light emitting diodes, LEDs) are arranged in the outer casing 110 of the aerosol generation device 100. The indicator(s) 104 can be an LED bar comprising a plurality of LEDs. In other examples, the one or more indicators may be audio indicators capable of emitting an audio signal, or haptic indicators capable of providing a vibration signal to the user, or a combination of the aforementioned indicators.

FIG. 2 shows a block diagram of further components of the aerosol generation device 100 described with reference to FIGS. 1A and 1B.

As described above, the aerosol generation device 100 comprises a heater 108 arranged within the cavity to aerosolise the tobacco rod or aerosol generating material. In some examples the heater 108 provides heat to the tobacco rod by thermal conduction. In other examples, the heater 108 can be arranged to provide power by induction to a heating element arranged within the tobacco rod.

The aerosol generation device 100 comprises a battery 106. The battery 106 is used to power the aerosol generation device 100, including the heater 108 and indicator(s) 104.

The indicator(s) 104 are used to provide operational state information to a user of the aerosol generation device 100. For example, the indicator(s) 104 can indicate information relating to the charge state of the battery 106 as described subsequently. The indicator(s) 104 can also indicate information relating to a usage state of the device, such as whether the device is switched on or off.

The operation of the aerosol generation device 100 is controlled by a controller 102. In some examples the controller 102 is a microprocessor unit. The controller 102 comprises memory and processors, wherein the processors are arranged to execute instructions stored in the memory which provide operational control over the aerosol generation device 100, including controlling the power flow from the battery 106 to the heater 108.

In operation, a user of the aerosol generation device 100 moves the slidable lid 112 from the closed position (FIG. 1A) to the open position (FIG. 1B) and inserts a tobacco rod into the cavity or heating chamber through the closable opening 114. The heater 108 is then initiated. In some examples, the heater 108 is initiated by the controller 102 detecting that the user has provided an input such as pressing a heating button integrated into the device. In other examples, the heater 108 may initiated by the controller 102 detecting the presence of a tobacco rod in the heating chamber, by the detection of the lid 112 being moved from the closed position to the opened position or a third position that initiates heating, or the detection of an air flow when a user inhales upon the tobacco rod.

When the heater 108 is initiated, power is directed from the battery 106 to the heater 108 by the controller 102. The battery 106 may store enough charge to fully aerosolise one or more tobacco rods. The full aerosolisation of one tobacco rod can be considered an aerosolisation session.

The heater 108 heats the tobacco rod, forming an aerosol. The user of the device can then inhale on the end of the tobacco rod projected from the device to inhale the generated aerosol.

Following the aerosolisation of the tobacco rod, the user can remove the expired tobacco rod from the device and close the closable opening 114 by moving the lid 112 to the closed position (FIG. 1A). In some examples, the controller 102 can determine to switch off the heater 108 by stopping the power flow from the battery 106 to the heater 108. The controller 102 can determine to switch off the heater 108 in response to detecting that a heating button is no longer being pressed by the user. In other examples, the controller 102 can determine to switch off the heater 108 when detecting that the moveable lid 112 has been moved from the open position to the closed position.

During the operation of the aerosol generation device 100, the controller 102 is configured to determine the charge level of the battery 106, and to send an alert to the user of the aerosol generation device 100 if the remaining charge level of the battery 106 is sufficient for only a predetermined number of aerosolisation sessions. For example, the controller 102 can determine when the remaining battery charge level is sufficient for only one more aerosolisation session. In this way, the user can be alerted to the fact that after aerosolising the next tobacco rod, the battery 106 will need to be charged for subsequent aerosolisation sessions. This obviates the risk of the user wishing to carry out an aerosolisation session with a subsequent tobacco rod only to find that they cannot as the device does not have sufficient power remaining.

This process is explained in more detail with reference to the flow diagram presented in FIG. 3.

As step S301 the controller 102 measures the charge level of the battery 106.

At step S302 the controller 102 determines whether the measured charge level is sufficient for only a predetermined number N of aerosolisation sessions by the heater 108.

At step S303 the controller 102 indicates, using the indicator(s) 104 in a first manner, when the measured charge level is sufficient for only N aerosolisation sessions by the heater 108.

In more detail, at step S301, to measure the charge level of the battery 106, the controller 102 measures a battery electrical parameter indicative of the charging level. In an example, when measuring the charge level of the battery 106, the controller 102 is configured to measure a voltage of the battery 106. The measured battery voltage is then compared with predetermined battery voltages corresponding to predetermined battery charge levels.

As the state of charge of the battery 106 (i.e. the charge level) drops, for example due to aerosolisation sessions being executed, the voltage measured across the battery 106 also drops. A relationship between charge level as a percentage of the maximum charge level and the battery voltage can therefore be established. In other examples, other methods for determining the state of charge of the battery 106 may be used in place of the voltage measurement method.

Table 1 shows an exemplary look-up table for a battery 106 configured to provide power to the heater 108 for 20 aerosolisation sessions (i.e. a battery configured to provide power to the heater 108 to aerosolise 20 tobacco rods); the table illustrates an exemplary relationship between measured battery voltage, the corresponding battery charge level and a corresponding number of remaining aerosolisation sessions that can be powered with the battery charge level.

TABLE 1

| Battery Voltage (mV) | Battery Charge Level (%) | Number of Remaining Aerosolisation Sessions |
|---|---|---|
| >=4162 | 100 | 20 |
| >=4114 | 95 | 19 |
| >=4060 | 90 | 18 |
| >=4010 | 85 | 17 |
| >=3960 | 80 | 16 |
| >=3912 | 75 | 15 |
| >=3870 | 70 | 14 |
| >=3820 | 65 | 13 |
| >=3778 | 60 | 12 |
| >=3730 | 55 | 11 |
| >=3688 | 50 | 10 |
| >=3658 | 45 | 9 |
| >=3638 | 40 | 8 |
| >=3624 | 35 | 7 |
| >=3606 | 30 | 6 |
| >=3590 | 25 | 5 |
| >=3562 | 20 | 4 |
| >=3526 | 15 | 3 |
| >=3470 | 10 | 2 |
| >=3420 | 5 | 1 |
| Else | 0 | 0 |

In the example of a battery 106 that has capacity to aerosolise 20 tobacco rods, the look-up table can be constructed by measuring the battery voltage before and after aerosolising a tobacco rod, until all 20 tobacco rods are aerosolised. This can be repeated for multiple batteries and average battery voltages for each remaining number of tobacco rod aerosolisation sessions can be determined.

In more detail, at step S302, in an example in which the controller 102 is configured to determine and indicate when the battery 106 only has sufficient charge for one more aerosolisation session (N=1), the controller 102 compares the measured battery voltage to a first predetermined battery voltage and a second predetermined battery voltage that define endpoints of a battery voltage range. The first predetermined battery voltage is the battery voltage corresponding to two remaining aerosolisation sessions (3470 mV), and the second predetermined battery voltage is the battery voltage corresponding to one remaining aerosolisation session (3420 mV).

When the measured battery voltage is less than the minimum battery voltage for two remaining aerosolisation sessions (3470 mV, in the example of Table 1), but greater than or equal to the minimum charge level for one aerosolisation session (3420 mV, in the example of Table 1), the controller 102 determines that the remaining charge level is only sufficient for one aerosolisation session. That is, if the controller 102 determines that the measured battery voltage satisfies 3420 mV [Measured battery voltage]<3470 mV, the controller 102 determines that the measured charge level (by way of the measured battery voltage) is sufficient for only one aerosolisation session by the heater 108. In response to determining that the measured charge level is only sufficient for one aerosolisation session (S302), the controller 102 indicates, using the indicator(s) 104 in a first manner that the measured charge level is sufficient for only one more aerosolisation session (S303).

More generally at step S302, the controller 102 can determine whether the measured charge level (determined for example by measuring the battery voltage as described above) is sufficient for only N further aerosolisation sessions, where N is an integer number of remaining aerosolisation sessions that the battery 106 is capable of powering. The controller 102 compares the measured charge level to a first predetermined charge level and a second predetermined charge level, wherein the first predetermined charge level corresponds to the battery 106 having a charge level insufficient for N+1 aerosolisation sessions, and the second predetermined charge level corresponds to the battery 106 having a charge level sufficient for N aerosolisation sessions. In other words, the first predetermined charge level corresponds to the battery 106 having a minimum charge level required for N+1 aerosolisation sessions, and the second predetermined charge level corresponds to the battery 106 having a minimum charge level required for N aerosolisation sessions. The controller 102 then determines that the measured charge level is sufficient for only N aerosolisation sessions when the measured charge level is less than the first predetermined charge level and greater than or equal to the second predetermined charge level.

That is, the controller 102 can determine whether the measured charge level is sufficient for only N aerosolisation sessions by the heater 108 when the measured charge level satisfies: [Second predetermined charge level for N aerosolisation sessions]≤[Measured charge level of battery]<[First predetermined charge level for N+1 aerosolisation sessions].

In this way, the controller 102 can determine when only enough power remains in the battery 106 to fully aerosolize N aerosol generating material units/consumables (e.g. N tobacco rods). In an example, the predetermined charge levels are stored in memory accessible by the controller 102.

In some examples, the controller 102 of the aerosol generation device 100 may be pre-programmed to determine and indicate when the measured charge level is sufficient only for a specific number of remaining aerosolisation sessions (for example one remaining aerosolisation session). That is, the device may be preset to determine and indicate to the user when enough charge for only a specific number (for example one) aerosolisation sessions is available. In this case, the first and second predetermined charge levels may be specifically stored in the memory.

In some examples, such as that detailed above, the predetermined number N of aerosolisation sessions can be one (N=1); this is representative of the battery having only enough power remaining for one aerosolisation session. In another example N=2, representative of the battery having only enough power remaining for two aerosolisation sessions. In another example, N may be equal to the total number of units of aerosol generating material (or tobacco rods) in a packet, for example N=20. The skilled person will readily understand however that N can be any other suitable positive integer number.

In other examples, the user of the aerosol generation device 100 may define the predetermined number N of aerosolisation sessions for which it should be determined and indicated. For example, the user may wish to be indicated to when there is only enough charge remaining for two aerosolisation sessions. In such examples, the user may input the predetermined number N of aerosolisation sessions through an interface with the device (for example an interface built into the aerosol generation device 100, or a wired interface such as a USB connection, or a wireless interface such as a Bluetooth connection between the aerosol generation device 100 and an external device such as a smartphone). The controller 102 may then determine the first predetermined charge level for N+1 sessions and the second predetermined charge level for N sessions from a look-up table (such as Table 1) stored in memory accessible by the controller 102.

For illustrative purposes, Table 2 shows an alternative exemplary look-up table for a battery 106 configured to provide power to the heater 108 for 10 aerosolisation sessions (i.e. a battery configured to provide power to the heater 108 to aerosolise 10 tobacco rods).

TABLE 2

| Battery Voltage (mV) | Battery Charge Level (%) | Number of Remaining Aerosolisation Sessions |
| --- | --- | --- |
| >=4160 | 100 | 10 |
| >=4105 | 90 | 9 |
| >=4045 | 80 | 8 |
| >=3980 | 70 | 7 |
| >=3925 | 60 | 6 |
| >=3900 | 50 | 5 |
| >=3832 | 40 | 4 |
| >=3790 | 30 | 3 |
| >=3740 | 20 | 2 |
| >=3650 | 10 | 1 |
| Else | 0 | 0 |

In more detail at step S303, indicating using the indicator(s) 104 in a first manner may comprise illuminating one or more light sources such as light emitting diode(s) (LEDs) with a first flashing frequency or in a first pattern. Alternatively or additionally indicating using the first manner may comprise illuminating the one or more light sources in a first colour. In another example, indicating using the indicator in the first manner may comprise emitting a first audio signal using an audio emitter such as a speaker. In a further example, indicating using the indicator in the first manner may comprise vibrating the device with a first haptic feedback pattern using a vibration module. Indicating using the indicator(s) 104 in the first manner may comprise any combination of the aforementioned indications by any combination of the aforementioned indicators.

The controller 102 may be configured to automatically indicate using the indicator(s) 104 in the first manner in response to determining that the measured charge level is only sufficient the predetermined number N of aerosolisation sessions.

In some examples, the controller may automatically switch the heater on, starting the aerosolisation session, after step S303, or in response to detecting that a heater trigger such as the heating button has been pressed in combination with step S303 having occurred/occurring.

The process described with reference to FIG. 3 may be carried out by the controller 102 before an aerosolisation session begins. That is, when the controller 102 determines that an aerosolisation session is initiated, the controller 102 first measures the charge level of the battery 106 as described with reference to S301. The controller 102 then determines whether the measured charge level is sufficient for the predetermined number N of aerosolisation sessions (S302), and if so indicates this using the indicator (S303), before directing power from the battery 106 to the heater 108 such that the heater 108 can aerosolise the tobacco rod.

In a specific example, the controller 102 may carry out the process described with reference to FIG. 3 upon the detection that the closable opening 114 has moved from the closed position (FIG. 1A) to the open position (FIG. 1B), for example by detecting that the slidable lid 112 has moved between the two positions. This can be indicative of the beginning of an aerosolisation session.

Alternatively, the controller 102 may carry out the process described with reference to FIG. 3 upon the detection of a heating button having been pressed by the user of the aerosol generation device 100.

When determining that the closable opening is moved to the opened position, for example when the controller determines that the movable lid has moved to the open position, the controller can initiate a standby mode during which the charge level of the battery is measured. The controller can switch the heater on, and exit the standby mode, in response to determining that the charge level of the battery is sufficient for at least one full aerosolisation session. The controller can switch the heater on automatically in response to determining that the charge level of the battery is sufficient for at least one full aerosolisation session. Alternatively, the controller can switch the heater on when detecting that a heater trigger such as the heating button has been pressed in combination with having determined that the charge level of the battery is sufficient for at least one full aerosolisation session.

Measuring the charge level and determining and indicating when the measured charge level is sufficient for only the predetermined number N of aerosolisation sessions before each aerosolisation session is advantageous as a user can be made aware before the aerosolisation session that they only have the battery charge for N sessions remaining. This is particularly advantageous in the case of the predetermined number N being one, as the user will be informed before the aerosolisation session that this is the last aerosolisation session for which the battery 106 has sufficient charge.

In another example, the process described with reference to FIG. 3 may be carried out following the controller 102 determining that the aerosolisation session has been concluded. More specifically, the controller 102 may carry out the process described with reference to FIG. 3 upon the detection that the closable opening 114 has moved from the open position (FIG. 1B) to the closed position (FIG. 1A). This can be indicative of an aerosolisation session having been concluded. Alternatively, the controller 102 may carry out the process described with reference to FIG. 3 upon the detection of a heating button having been released by the user of the aerosol generation device 100.

Measuring the charge level and determining and indicating when the measured charge level is sufficient for only the predetermined number N of aerosolisation sessions after each aerosolisation session is advantageous as following the conclusion of the aerosolisation session, if the battery charge level is only sufficient for N more sessions, the user will be alerted. This is particularly advantageous in the case of the predetermined number N being one, as the user will be informed that the next aerosolisation session is the last aerosolisation session for which the battery 106 has sufficient charge.

In a further example, the process described with reference to FIG. 3 may be carried out following the controller 102 switching off the heater 108. In particular, the controller 102 can be configured to switch off the heater 108 before determining the charge level of the battery 106 in response to determining that the closable opening 114 has moved to the closed position.

Measuring the charge level after switching off the heater 108 can provide a more accurate measurement of the charge level of the battery 106 as a heating load is not being applied.

The aforementioned examples of when the process described with reference to FIG. 3 occurs with respect to an aerosolisation session may be used in combination with one another. For example, the charge level of the battery 106 may be measured (S301), and the determination (S302) and indication (S303) may be carried out both before and after an aerosolisation session.

FIG. 4 shows a flow diagram of further steps carried out by the controller 102 following the measurement of the battery charge level at step S301.

At step S402, following the measurement of the charge level of the battery 106 at step S301, the controller 102 determines whether the measured charge level is sufficient for at least one full aerosolisation by the heater 108.

At step S403, the controller 102 switches the heater 108 on. Step S403 may occur automatically in response to determining the charge level of the battery 106 is sufficient for at least one full aerosolisation session by the heater 108. Alternatively, step S403 may occur in response to the detection of an activation instruction when the charge level of the battery 106 is sufficient for at least one full aerosolisation session by the heater 108. In some examples, the activation instruction may comprise the controller 102 detecting that a heating button has been pressed by the user, the controller 102 the detecting the presence of a tobacco rod in the heating chamber, by the detection of the lid 112 being moved from the closed position to the opened position or a third position that initiates heating, or the detection of an air flow when a user inhales upon the tobacco rod.

In this way, the heater 108 is switched on only when there is sufficient power for a full aerosolisation session. This avoids the aerosol generation device 100 only being able to partially aerosolise the tobacco rod due to the battery 106 running out charge before completion of an aerosolisation session.

FIG. 5 shows a flow diagram of further steps carried out by the controller 102 following the measurement of the battery charge level at step S301.

At step S502, following the measurement of the charge level of the battery 106 at step S301, the controller 102 determines whether the measured charge level of the battery 106 is lower than that required for one full aerosolisation session by the heater 108.

At step S503, the controller 102 indicates using the indicator(s) 104 in a second manner that the measured charge level is insufficient for an aerosolisation session by the heater 108 in response to determining that the charge level of the battery 106 is lower than that required for one full aerosolisation session.

Indicating using the indicator(s) 104 in a second manner may comprise illuminating one or more light sources, such as LEDs, with a second flashing frequency or in a second pattern. The second flashing frequency or second pattern may be different to the first flashing frequency or first pattern associated with the first manner of using the indicator(s) 104. Alternatively or additionally indicating using the second manner may comprise illuminating the one or more light sources in a second colour different to the first colour associated with the first manner. In another example, indicating using the indicator in the second manner may comprise emitting a second audio signal, different to the first audio signal associated with the first manner, using an audio emitter such as a speaker. In a further example, indicating using the indicator in the second manner may comprise vibrating the device with a second haptic feedback pattern, different to the first haptic feedback patter associated with the first manner, using a vibration module. Indicating using the indicator(s) 104 in the second manner may comprise any combination of the aforementioned indications by any combination of the aforementioned indicators.

In this way, the user is informed when there is insufficient power for a full aerosolisation session. This avoids the user finding, part way through an aerosolisation session, that they are only able to partially aerosolise the tobacco rod due to the battery 106 running out charge before completion of an aerosolisation session. This avoids potential wastage of a tobacco rod due to only partial aerosolisation.

The indication in the second manner may occur after the heater has been switched off, for example when the movable lid is closed and the controller determines to switch the heater off. Alternatively, the indication in the second manner may occur when the movable lid moves to the open position, and for example, the device enters the standby mode.

After the heater is switched off following the final aerosolisation session for which battery power remains, the aerosolisation mode cannot be activated again. For example, the heater is secured in off mode irrespective of any action with the movable lid or the heater button. The device may be enabled again only after the battery is charged to a level at least equal to a minimum threshold above or at the level that triggers indication that enough battery remains for only one aerosolisation session. The aerosol generation device may still operate in standby mode for a battery charging check (e.g. as a confirmation of the low level).

In some examples, the controller 102 is configured to determine that the measured charge level is lower than that required for one full aerosolisation session by the heater 108 in response to executing one aerosolisation session after determining that the measured charge level is sufficient for only one full aerosolisation session by the heater 108. That is, if the controller 102 determines that the measured charge level is only sufficient for one full aerosolisation session, after this next aerosolisation session has been executed, the controller 102 can determine that the charge level is then lower than that required for any further aerosolisation sessions, and the controller 102 can then automatically indicate using the indicator(s) 104 in the second manner (S503).

FIG. 6 shows a flow diagram of further steps carried out by the controller 102 following the measurement of the battery charge level at step S301.

At step S602, following the measurement of the charge level of the battery 106 at step S301, the controller 102 is configured to determine an available number of aerosolisation sessions that can be sufficiently powered by the battery 106 based upon the measured charge level.

At step S603, the controller 102 indicates using the indicator(s) 104 in a third manner, an indication of the available number of aerosolisation sessions that can be sufficiently powered by the battery 106. The controller 102 may switch the heater on, following or in combination the indication in the third manner.

Steps S602 and S603 can occur before steps S302 and S303, for example when the battery number of available aerosolisation sessions is greater than or equal to N.

In more detail, at step S602 the controller 102 can determine the available number of aerosolisation sessions that can be sufficiently powered by comparing the measured charge level of the battery 106 (for example by measuring the battery voltage as previously described) to a look-up table containing battery charge levels and corresponding numbers of remaining aerosolisation sessions that can be powered with the battery charge level, such as the exemplary tables presented as Table 1 and Table 2. The look-up table can be stored in memory accessible by the controller 102.

In some examples, the indication of the available number of aerosolisation sessions that can be sufficiently powered by the battery 106 may be presented as a number of remaining tobacco rods that can be aerosolised on a visual display screen. In other examples, the indication of the available number of aerosolisation sessions that can be sufficiently powered by the battery 106 may be presented as a percentage of the total battery capacity.

In another example, the indicator(s) 104 may comprise a plurality of light sources, such as LEDs, which can form an LED bar 104. Indicating in the third manner can comprise illuminating a number of the LEDs of such an LED bar proportionally to the battery charge level and/or available number of aerosolisation sessions that can be sufficiently powered by the battery 106.

In a specific implementation, the controller 102 measures the charge level of the battery 106 by measuring the battery voltage at step S301. This is translated to the battery charge level using the look-up table. If the indicator comprises 8 LEDs, the number of LEDs that are to be illuminated (NUM_LEDS_ILLUMINATED) at step S603 can be calculated from the measured charge level of the battery (BATTERY_CHARGE) as: NUM_LEDS_ILLUMINATED= (BATTERY_CHARGE*8)/100)

For example, if the charge level of the battery 106 is calculated as 50%, 5 LEDs would be illuminated.

More generally, the number of LEDs illuminated of the total number of LEDs (NUM_LEDS_TOTAL) can be expressed as: NUM_LEDS_ILLUMINATED= (BATTERY_CHARGE*NUM_LEDS_TOTAL)/100)

When NUM_LEDS_ILLUMINATED is non-integer, it can be rounded to the nearest integer.

Figure 7C:
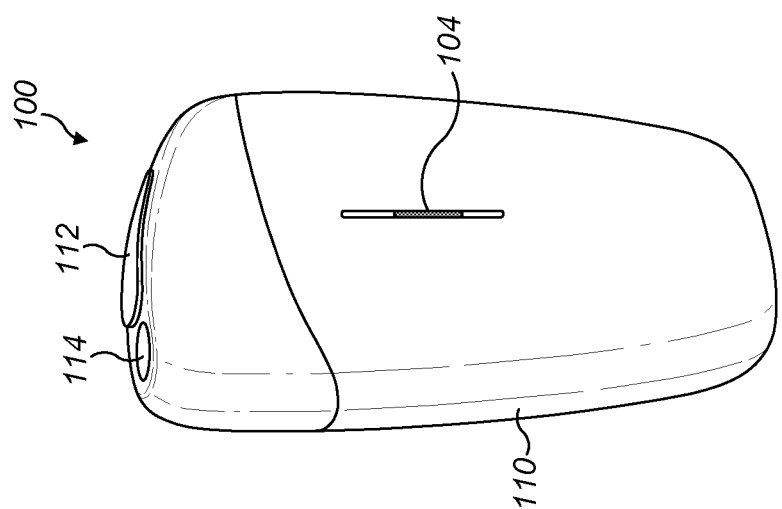
FIGS. 7A to 7E are schematic diagrams of an aerosol generation device in a series of operational states.
Figure 7B:
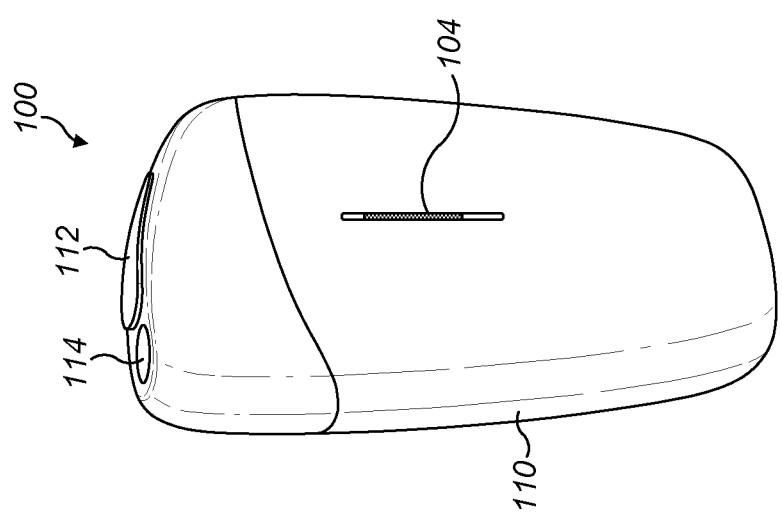
Figure 7A:
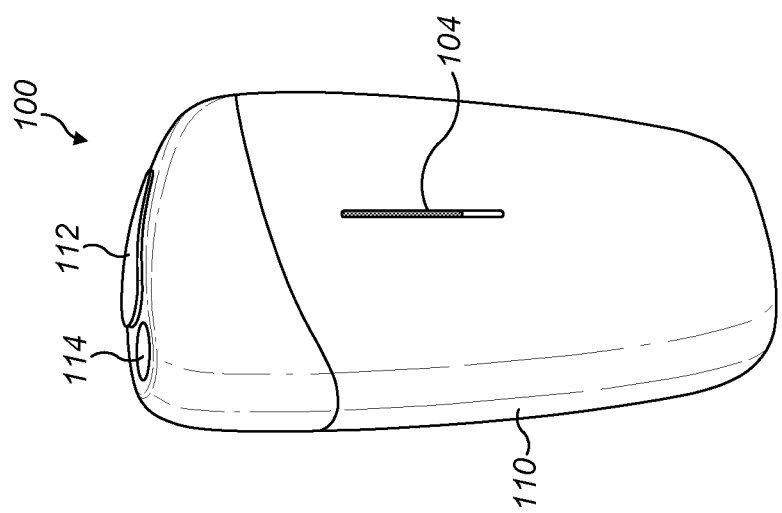
Figure 7E:
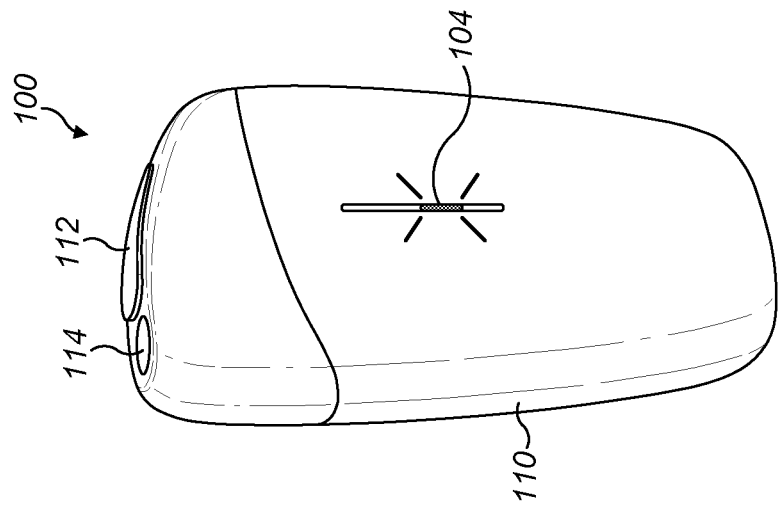
Figure 7D:
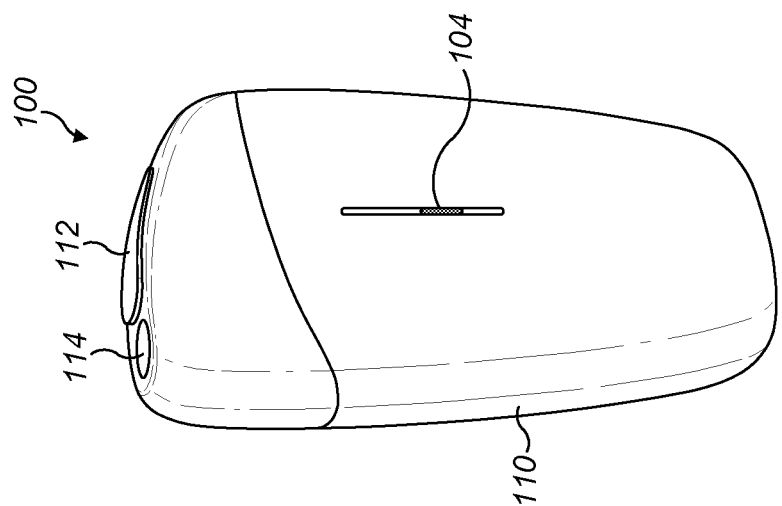

In this way, as the battery charge level drops, the number of LEDs that are illuminated decreases so as to convey this information to the user of the device. This is visually presented in FIGS. 7A to 7E. FIG. 7A corresponds to a fully charged battery 106, with the LED bar fully illuminated. FIG. 7B corresponds to a battery 106 with a charge level of 75%. FIG. 7C corresponds to a battery 106 with a charge level of 50%. FIG. 7D corresponds to a battery 106 with a charge level of 25%.

When NUM_LEDS_ILLUMINATED is less than one, one LED can be illuminated as described subsequently. In FIG. 7E an LED of the LED bar is flashing at a frequency to indicate that there is only enough battery charge remaining for one further aerosolisation session (rather than zero LEDs being illuminated). That is, the LED bar is indicating in the first manner. When the charge level drops below this point, the LED will flash at a different frequency, such as a higher frequency, to indicate that there is not enough battery power remaining for a further aerosolisation session. That is, the LED bar will indicate in the second manner.

In other examples, a display integrated into the device may present the percentage charge level, or the discrete number of aerosolisation sessions that can be powered by the remaining battery charge level.

The LED bar 104 can further be used to indicate a heating phase for an aerosolisation session. For example when the heater 108 of the aerosol generation device 100 is heating up to the operating (or target aerosolisation) temperature, the LEDs of the LED bar 104 can be sequentially illuminated by the controller 102 proportionally to the heating progression based upon a heater temperature determined by the controller compared to the operating temperature. As the illumination progress, the illuminated LEDs may pulsate of flash during the heating phase. A first haptic feedback (such as a single vibration) can also be provided by a vibration module to indicate that the heating process has begun. A second haptic feedback (such as two shorter vibrations) can be provided to indicate that the heating has been completed. When the device is ready for an aerosolisation session, an indicative haptic feedback can be provided (such as two shorter vibrations) with the LED bar fully illuminated.

The LED bar 104 can also be used to indicate the progress of the aerosolisation session, with the LEDs of the LED bar 104 sequentially un-illuminating as the session progresses. The controller 102 determines the session progress for example based upon an elapsed time of a predetermined aerosolisation session time period. Toward the end of the session, for example when 20 seconds are remaining, a single haptic feedback vibration can be provided using the vibration module. At the same time, toward the end of the session, the LED bar 104 can pulsate or flash. When the session has finished, another haptic feedback vibration can be provided to indicate this to the user of the aerosol generation device 100.

In the aforementioned example, a single haptic feedback vibration may be for example 1 second in length, and two shorter haptic feedback vibrations may for example involve a 0.5 second vibration, followed by a 0.3 second pause, followed by another 0.5 second vibration. The haptic feedback vibrations can be provided by a vibration module triggered by the controller 102.

The person skilled in the art will understand that the indicator(s) 104 used in the first, second and third manners may be the same indicators or different indicators. In some examples, where there is a plurality of indicators the first, second and third manners may use subsets of the plurality of indicators. For example, when the indicator is a plurality of LEDs, one LED may be flashed at different frequencies or in different patterns for the first and second manners, and multiple LEDs may be illuminated to show the charge level in the third manner.

The person skilled in the art will understand that the processes described with reference to FIGS. 3, 4, 5 and/or 6 may be combined to form a single overall process based upon measuring the charge level of the battery 106 and performing subsequent further actions.

The processing steps described herein carried out by the controller 102 may be stored in a non-transitory computer-readable medium, or storage, associated with the controller 102. A computer-readable medium can include non-volatile media and volatile media. Volatile media can include semiconductor memories and dynamic memories, amongst others. Non-volatile media can include optical disks and magnetic disks, amongst others.

It will be readily understood to the skilled person that the preceding embodiments in the foregoing description are not limiting; features of each embodiment may be incorporated into the other embodiments as appropriate.

The invention claimed is:

1. An aerosol generation device comprising an indicator and a controller connectable to a battery and a heater, the heater configurable to aerosolise a unit of aerosol generating material in an aerosolisation session and the battery configurable to provide power to the heater for one or more aerosolisation sessions, wherein the controller is configured to:
    measure a charge level of the battery;
    determine whether the measured charge level is sufficient for only a predetermined number N of aerosolisation sessions by the heater; and
    indicate, using the indicator in a first manner, when the measured charge level is sufficient for only N aerosolisation sessions by the heater,
    wherein, when determining whether the measured charge level is sufficient for only N aerosolisation sessions by the heater, the controller is further configured to:
    compare the measured charge level to a first predetermined charge level and a second predetermined charge level, wherein the first predetermined charge level corresponds to the battery having a charge level insufficient for N+1 aerosolisation sessions, and the second predetermined charge level corresponds to the battery having a charge level sufficient for N aerosolisation sessions; and
    determine that the measured charge level is sufficient for only N aerosolisation sessions when the measured charge level is less than the first predetermined charge level and greater than or equal to the second predetermined charge level.

2. The aerosol generation device of claim 1, wherein the controller is further configured to:
    determine whether the measured charge level is sufficient for at least one full aerosolisation session by the heater; and
    switch the heater on automatically in response to determining the charge level of the battery is sufficient for at least one full aerosolisation session by the heater; or
    switch the heater on in response to detecting an activation instruction when the charge level of the battery is sufficient for at least one full aerosolization session by the heater.

3. The aerosol generation device of claim 1, wherein the indicator comprises at least one light emitting source in the aerosol generation device.

4. The aerosol generation device of claim 1, wherein the controller is further configured to:
    determine whether the measured charge level of the battery is lower than a charge level required for one full aerosolisation session by the heater; and
    indicate, using the indicator in a second manner, that the measured charge level is insufficient for an aerosolisation session by the heater in response to determining that the charge level of the battery is lower than a charge level required for one full aerosolization session.

5. The aerosol generation device of claim 1, wherein the controller is further configured to:
    determine that the measured charge level is lower than a charge level required for one full aerosolisation session by the heater in response to executing one aerosolisation session after determining that the measured charge level is sufficient for only one full aerosolisation session by the heater.

6. The aerosol generation device of claim 1, wherein when measuring the charge level, the controller is configured to:
    measure a voltage of the battery; and
    compare the measured battery voltage to predetermined battery voltages with corresponding predetermined battery charge levels; and
    determine the measured battery charge level based upon a comparison between the measured battery voltage and the predetermined battery voltages and the corresponding predetermined battery charge levels.

7. The aerosol generation device of claim 1, wherein the controller is further configured to:
   determine an available number of aerosolisation sessions that can be sufficiently powered by the battery based upon the measured charge level; and
   indicate, using the indicator in a third manner, an indication of the available number of aerosolisation sessions that can be sufficiently powered by the battery.

8. An aerosol generation device system comprising the aerosol generation device according to claim 1, and further comprising a battery and a heater.

9. The aerosol generation device of claim 1, wherein the controller is configured to:
   measure the charge level of the battery before each aerosolisation session.

10. The aerosol generation device of claim 1, wherein the controller is configured to:
    measure the charge level of the battery after each aerosolisation session.

11. The aerosol generation device of claim 1, wherein the controller is configured to:
    measure the charge level of the battery when the heater is switched off.

12. The aerosol generation device of claim 1, wherein the aerosol generation device further comprises a closable opening through which unit of the aerosol generating material is received, and wherein the controller is configured to:
    measure the charge level of the battery when determining the closable opening is moved to a closed position.

13. The aerosol generation device of claim 12, wherein when determining the closable opening is moved to the closed position, the controller is further configured to switch off the heater before determining the charge level of the battery.

14. The aerosol generation device of claim 1, wherein the aerosol generation device further comprises a closable opening through which unit of the aerosol generating material is received, and wherein the controller is configured to:
    measure the charge level of the battery when determining the closable opening is moved to an opened position.

15. The aerosol generation device of claim 14, wherein when determining the closable opening is moved to the opened position, the controller is further configured to:
    initiate a standby mode during which the charge level of the battery is measured; and
    switch the heater on, and exit the standby mode, in response to determining that the charge level of the battery is sufficient for at least one full aerosolisation session by the heater.

16. A method of operating an aerosol generation device comprising an indicator and a controller connectable to a battery and a heater, the heater configurable to aerosolise a unit of aerosol generating material in an aerosolisation session and the battery configurable to provide power to the heater for one or more aerosolisation sessions, wherein the method comprises:
    measuring, by the controller, a charge level of the battery;
    determining, by the controller, whether the measured charge level is sufficient for only a predetermined number N of aerosolisation sessions by the heater; and
    indicating, using the indicator in a first manner, when the measured charge level is sufficient for only N aerosolisation sessions by the heater,
    wherein, determining whether the measured charge level is sufficient for only N aerosolisation sessions by the heater comprises:
    comparing the measured charge level to a first predetermined charge level and a second predetermined charge level, wherein the first predetermined charge level corresponds to the battery having a charge level insufficient for N+1 aerosolisation sessions, and the second predetermined charge level corresponds to the battery having a charge level sufficient for N aerosolisation sessions; and
    determining that the measured charge level is sufficient for only N aerosolisation sessions when the measured charge level is less than the first predetermined charge level and greater than or equal to the second predetermined charge level.

17. A non-transitory computer-readable medium storing instructions thereon that, when executed by one or more processors, cause the one or more processors to control an aerosol generation device, wherein the aerosol generation device comprises an indicator and a controller connectable to a battery and a heater, the heater configurable to aerosolise a unit of aerosol generating material in an aerosolisation session and the battery configurable to provide power to the heater for one or more aerosolisation sessions, and wherein the instructions cause the one or more processors to:
    measure, by the controller, a charge level of the battery;
    determine, by the controller, whether the measured charge level is sufficient for only a predetermined number N of aerosolisation sessions by the heater; and
    indicate, using the indicator in a first manner, when the measured charge level is sufficient for only N aerosolisation sessions by the heater,
    wherein, determining whether the measured charge level is sufficient for only N aerosolisation sessions by the heater comprises:
    comparing the measured charge level to a first predetermined charge level and a second predetermined charge level, wherein the first predetermined charge level corresponds to the battery having a charge level insufficient for N+1 aerosolisation sessions, and the second predetermined charge level corresponds to the battery having a charge level sufficient for N aerosolisation sessions; and
    determining that the measured charge level is sufficient for only N aerosolisation sessions when the measured charge level is less than the first predetermined charge level and greater than or equal to the second predetermined charge level.

* * * * *